United States Patent [19]
Lin et al.

[11] Patent Number: 5,742,590
[45] Date of Patent: Apr. 21, 1998

[54] METHOD AND APPARATUS FOR SCHEDULING AIRTIME IN A RADIO COMMUNICATION SYSTEM

[75] Inventors: Jyh-Han Lin, Fort Worth; Alain Charles Louis Briancon, McKinney, both of Tex.

[73] Assignee: Motorola, Inc., Schaumburg, Ill.

[21] Appl. No.: 701,373

[22] Filed: Aug. 22, 1996

[51] Int. Cl.[6] .................................................. H04J 3/14
[52] U.S. Cl. .......................................... 370/252; 370/338
[58] Field of Search ................................. 370/241, 252, 370/253, 310, 328, 329, 330, 336, 338, 341, 343, 345, 346, 437, 465, 468; 455/422, 450, 453, 507, 509, 512, 515, 62, 67.1

*Primary Examiner*—Alpus H. Hsu
*Assistant Examiner*—Kwang B. Yao
*Attorney, Agent, or Firm*—R. Louis Breeden; Philip P. Macnak

[57] ABSTRACT

A stochastic method and apparatus schedules airtime in a radio communication system having a plurality of transmission protocols. At a queue measurement time airtimes are measured (402) that are required for transmitting messages stored in queues (222) corresponding to the plurality of transmission protocols. A corresponding plurality of estimated arrival rates are determined (404) equal to estimated rates of increase of the plurality of airtimes due to arriving traffic. An objective function is structured (408) equal to a sum of penalties corresponding to the plurality of transmission protocols, the penalties dependent upon the plurality of airtimes and the plurality of estimated arrival rates, and further dependent upon an optimal airtime allocation decision. The optimal airtime allocation decision is derived (410) by minimizing the objective function, and then airtime is allocated (412) among the plurality of transmission protocols in accordance with the optimal airtime allocation decision.

16 Claims, 5 Drawing Sheets

METHOD AND APPARATUS FOR SCHEDULING AIRTIME IN A RADIO COMMUNICATION SYSTEM

RELATED APPLICATION

"Method and Apparatus for Assigning Channels to Transmitters in a Radio Communication System", U.S. pending aplication Ser. No. 08/691,082, by Lin et al., filed on Aug. 1, 1996.

FIELD OF THE INVENTION

This invention relates in general to radio communication systems, and more specifically to a method and apparatus for scheduling airtime in a system having a plurality of transmission protocols.

BACKGROUND OF THE INVENTION

In prior art radio communication systems, airtime schedulers have relied on queue sizes for airtime allocation and have not considered the airtime needs of reuse traffic. In addition, prior art airtime schedulers have utilized "memoryless" and "single-decision" algorithms in the sense that they have considered only existing traffic loads and have allocated airtime for only one protocol at a time.

Modern radio communication systems can support multiple transmission protocols and a mixture of simulcast and cellular reuse traffic. In such an environment, airtime allocation using prior art techniques can have a significant negative impact on channel airtime efficiency and message latency.

Thus, what is needed is a method and apparatus which can provide a new type of stochastic, "multiple decision" airtime scheduler. Preferably, the new method and apparatus not only should consider the present traffic load but also should construct a stochastic traffic model that can allocate airtime for multiple protocols. In addition, the method and apparatus should coordinate with dynamic channel allocation decisions made for reuse traffic.

SUMMARY OF THE INVENTION

An aspect of the present invention is a stochastic method for scheduling airtime in a radio communication system having a plurality of transmission protocols. The method comprises the steps of measuring a plurality of airtimes required to transmit messages stored at a queue measurement time in queues corresponding to the plurality of transmission protocols, and determining a corresponding plurality of estimated arrival rates equal to estimated rates of increase of the plurality of airtimes due to arriving traffic. The method further comprises the steps of structuring an objective function equal to a sum of penalties corresponding to the plurality of transmission protocols, the penalties dependent upon the plurality of airtimes and the plurality of estimated arrival rates, and further dependent upon an optimal airtime allocation decision. The method also includes the steps of deriving the optimal airtime allocation decision by minimizing the objective function, and allocating airtime among the plurality of transmission protocols in accordance with the optimal airtime allocation decision.

Another aspect of the present invention is a controller for scheduling airtime in a radio communication system having a plurality of transmission protocols. The controller comprises a processing system for directing operations of the controller, a network interface coupled to the processing system for receiving messages from message originators, and a transceiver interface coupled to the processing system for controlling a plurality of transmitters to send the messages utilizing the plurality of transmission protocols. The processing system is programmed to measure a plurality of airtimes required to transmit the messages stored at a queue measurement time in queues corresponding to the plurality of transmission protocols, and to determine a corresponding plurality of estimated arrival rates equal to estimated rates of increase of the plurality of airtimes due to arriving traffic. The processing system is further programmed to structure an objective function equal to a sum of penalties corresponding to the plurality of transmission protocols, the penalties dependent upon the plurality of airtimes and the plurality of estimated arrival rates, and further dependent upon an optimal airtime allocation decision. The processing system is also programmed to derive the optimal airtime allocation decision by minimizing the objective function, and to allocate airtime among the plurality of transmission protocols in accordance with the optimal airtime allocation decision.

DESCRIPTION OF THE PREFERRED EMBODIMENT

Figure 1:
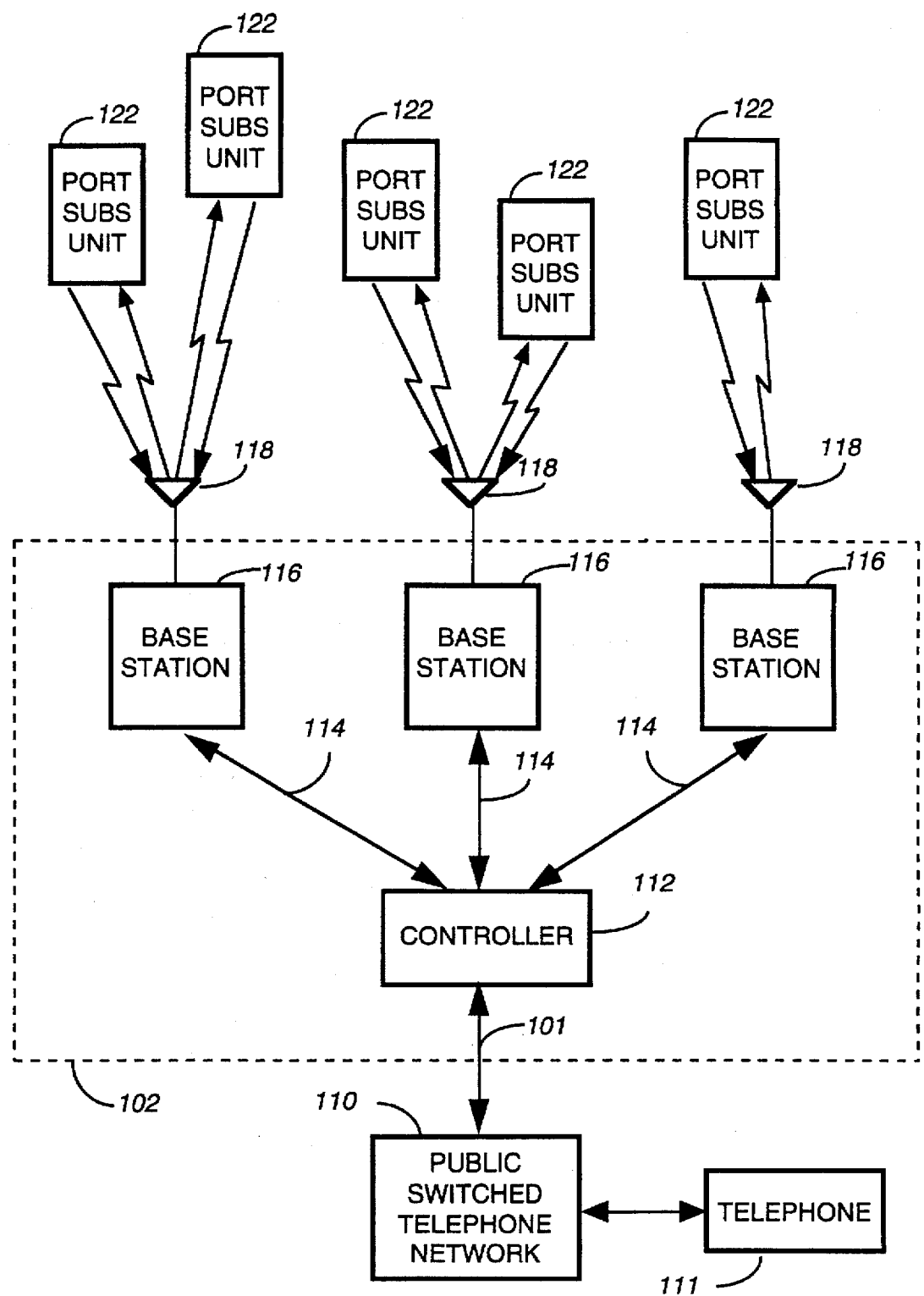
FIG. 1 is an electrical block diagram of a radio communication system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of conventional portable subscriber units 122, preferably having acknowledge-back capability, such as the Tango™ subscriber unit manufactured by Motorola, Inc. of Schaumburg, Ill. The base stations 116 are used for communicating with the portable subscriber units 122 utilizing conventional radio frequency (RF) techniques, and are coupled by communication links 114 to the controller 112, which controls the base stations 116. The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized as well for the portable subscriber unit 122, the controller 112, and the base stations 116.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and data or voice messages originated by a caller. The RF signals transmitted by the portable subscriber units 122 to the base stations 116 (inbound messages) comprise responses that include positive acknowledgments (ACKs), negative acknowledgments (NAKs), and unscheduled messages. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols, e.g., the well-known POCSAG protocol, can be used as well. It will be further appreciated that, alternatively, a one-way radio communication system can be utilized, with some limitations, in accordance with the present invention.

Figure 2:
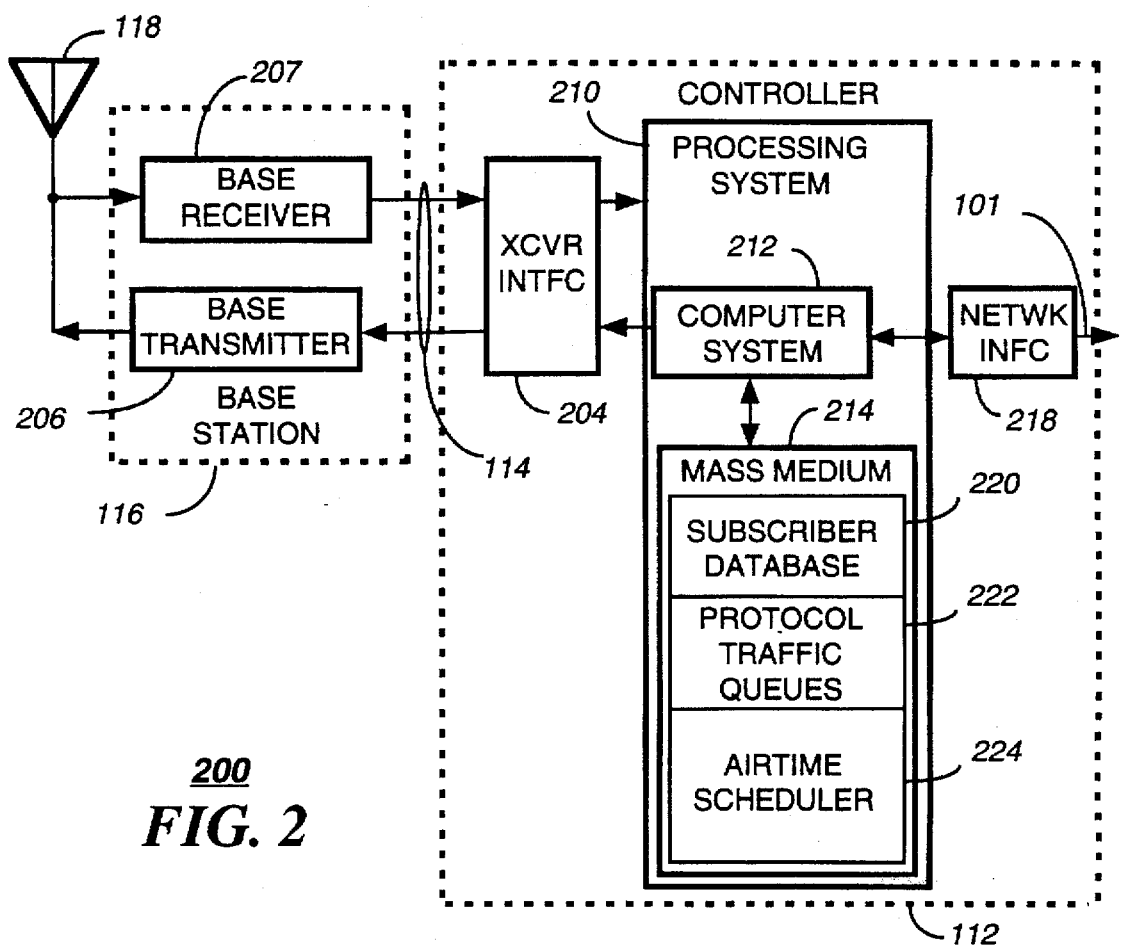
FIG. 2 is an electrical block diagram of portions of a controller and base station in accordance with the present invention.

FIG. 2 is an electrical block diagram 200 of portions of the controller 112 and the base station 116 in accordance with the present invention. The controller 112 includes a processing system 210, a transceiver interface 204, and a network interface 218. The base station 116 includes a base transmitter 206 and, preferably, at least one base receiver 207.

The processing system 210 is used for directing operations of the controller 112. The processing system 210 preferably is coupled through the transceiver interface 204 to the base transmitter 206 via the communication link 114. The processing system 210 preferably also is coupled through the transceiver interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The mass storage medium 214 is programmed to include, for example, a subscriber database 220, comprising subscriber user information such as addressing and programming options of the portable subscriber units 122. The mass storage medium 214 also is programmed to include protocol traffic queues 222 for providing, through well-known techniques, a measure of the message traffic in queue for each of the transmission protocols utilized in the system. In addition, the mass storage medium 214 includes software comprising an airtime scheduler 224 for scheduling airtime in a manner that minimizes selected penalties in accordance with the present invention.

The conventional computer system 212 is preferably programmed by way of this and other software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207. It will be further appreciated that, alternatively, in some systems the transmitter 206 can be arranged such that it can transmit a plurality of independent messages on a plurality of communication channels at the same time.

Figure 3:
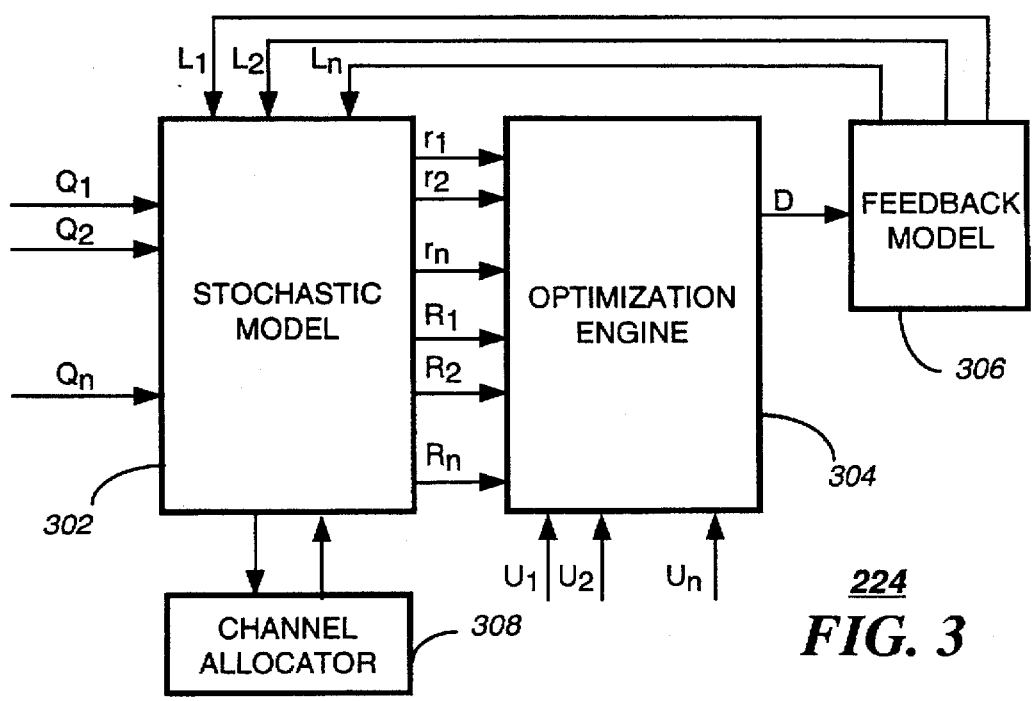
FIG. 3 is a block diagram depicting a mathematical model of an airtime scheduler in accordance with the present invention.

Referring to FIG. 3, a block diagram depicts a mathematical model of the airtime scheduler 224 in accordance with the present invention. Briefly, the airtime scheduler 224 includes a stochastic model 302 for deriving a plurality of airtime estimates $R_1 \ldots R_n$ needed to transmit traffic $Q_1 \ldots Q_n$ queued for each of the protocols in the protocol traffic queues 222. The stochastic model 302 also computes a plurality of estimated "arrival rates" $r_1 \ldots r_n$ of airtime needed to serve new traffic arriving every second. The arrival rates are adjusted in response to actual arrival rates and actual penalties $L_1 \ldots L_n$ calculated and fed back from a feedback model 306 during a transmission cycle responsive to the airtime scheduler 224.

In addition, the stochastic model 302 is coupled to a channel allocator 308 for receiving information including channel assignments for reuse traffic, which is then used by the airtime scheduler 224 in scheduling airtime for the reuse traffic. The channel allocator 308 preferably is similar to the channel allocation system disclosed and claimed in a related U.S. patent application titled "Method and Apparatus for Assigning Channels to Transmitters in a Radio Communication System", U.S. pending application Ser. No. 08/691, 082, by Lin et al., filed on Aug. 1, 1996, which application is hereby incorporated herein by reference.

The stochastic model passes the airtime estimates $R_1 \ldots R_n$ and the arrival rates $r_1 \ldots r_n$ to an optimization engine 304, which ultimately determines an optimal airtime allocation decision D comprising a transmission order and a transmission duration for each of the protocols in accordance with the present invention. If desired, deadlines $U_1 \ldots U_n$ for beginning transmission of each of the protocols can also be programmed into the optimization engine 304. The optimization engine 304 preferably utilizes dynamic programming techniques to determine the optimal airtime allocation decision D. The decision is then used by the processing system 210 for allocating the airtime of the radio communication system. The decision is also passed to the feedback model 306, for calculating the actual penalties $L_1 \ldots L_n$ that result from execution of the decision. Further details of the operation of the airtime scheduler 224 will be presented herein below.

Figure 4:
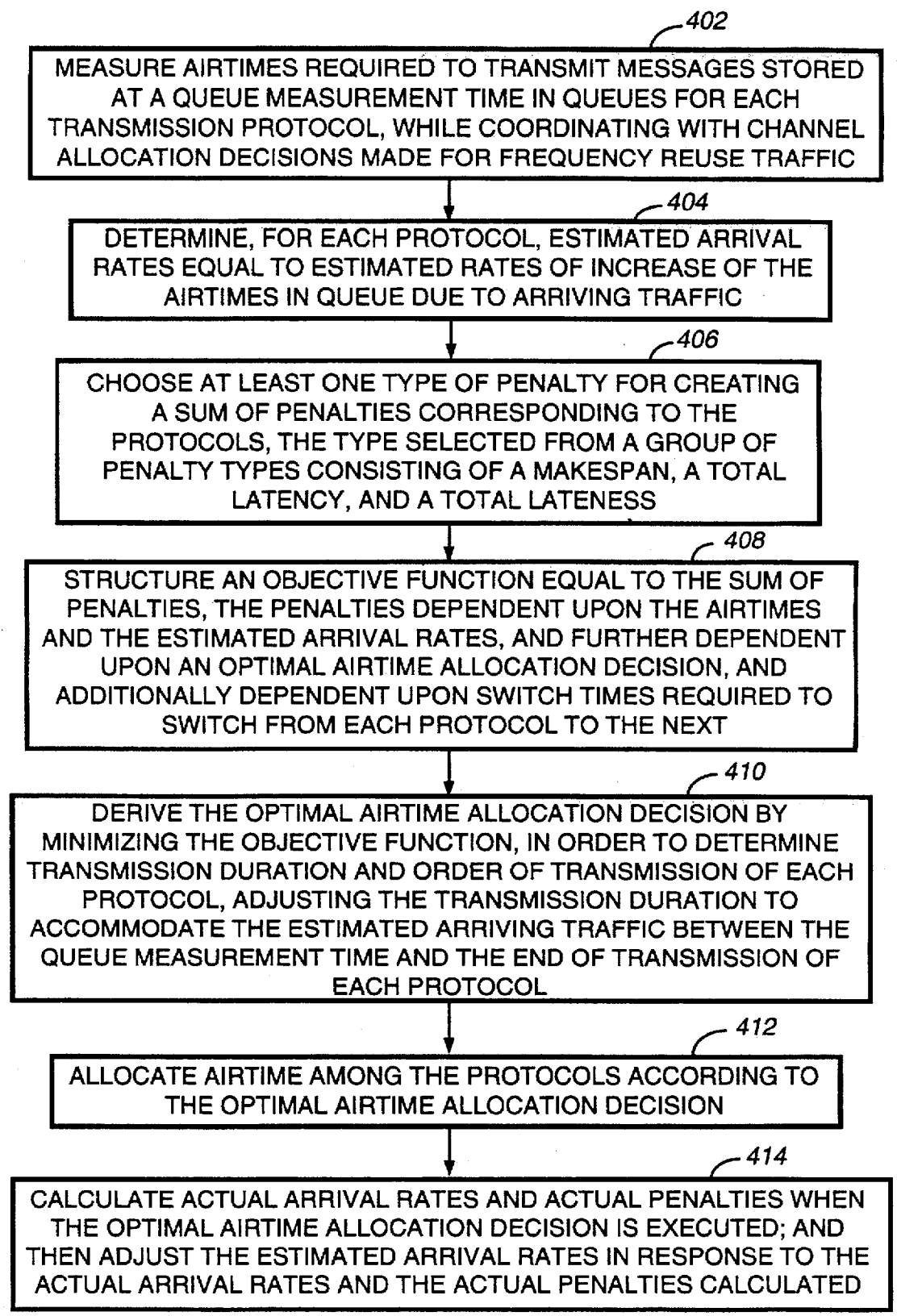
FIG. 4 is a flow chart depicting operation of the airtime scheduler in accordance with the present invention.

Referring to FIG. 4, a flow chart 400 depicts operation of the airtime scheduler 224 in accordance with the present invention. All operations of the airtime scheduler 224 are performed by the processing system 210, which is programmed by the airtime scheduler 224, along with other software elements of the mass medium 214. First, the processing system 210 measures 402, by well-known techniques, airtimes ($R_1 \ldots R_n$) required to transmit messages in queue for each protocol on each channel at a queue measurement time, while coordinating with channel allocation decisions made by the channel allocator 308 for frequency reuse traffic. Next, the processing system 210 determines 404 for each protocol, through well-known techniques, an estimated arrival rate $r_i$ equal to an estimated rate of increase of the airtime in queue for the protocol due to arriving traffic. Then the processing system 210 chooses 406 at least one type of penalty for creating a sum of penalties corresponding to the protocols. The type of penalty preferably is selected from a group of penalty types consisting of a makespan (i.e., the total time from start to finish of a complete transmission cycle), a total latency (i.e., a sum across all protocols of the time from the beginning of the complete transmission cycle to the finish of each protocol), and a total lateness (i.e., a sum across all protocols of a length of time, after a transmission deadline assigned to each protocol is passed, before transmission of the protocol begins). It will be appreciated that, alternatively, other types of penalties can be selected when appropriate. It will be further appreciated that different penalty types can be utilized for different protocols. For example, the penalty type for a first protocol can be latency, while the penalty type for a second protocol can be lateness.

The processing system 210 then structures 408 an objective function equal to the sum of penalties, the penalties dependent upon the airtimes and the estimated arrival rates, and further dependent upon an optimal airtime allocation decision, and additionally dependent upon switch times required to switch from each protocol to the next. Details and examples of the structuring of the objective function will be presented below. The processing system 210 next derives 410 the optimal airtime allocation decision by minimizing the objective function, in order to determine transmission duration and order of transmission of each transmission protocol, adjusting the transmission duration to accommodate the estimated arriving traffic between the queue measurement time and the end of transmission of each transmission protocol. Preferably, dynamic programming techniques are used to minimize the objective function in a well-known manner. It will be appreciated that, alternatively, an optimal policy (example given below) can be used to minimize the objective function. The processing system 210 then allocates 412 airtime among the transmission protocols according to the optimal airtime allocation decision, and starts the transmission cycle.

While executing the transmission cycle, the processing system 210 calculates 414 actual arrival rates and actual penalties, and then adjusts the estimated arrival rates in response to the actual arrival rates and the actual penalties calculated. In this manner the estimated arrival rates advantageously will become more representative of actual arrival rates, thereby further improving performance of the airtime scheduler 224.

The mathematical model utilized by the airtime scheduler 224 will now be described in detail.

Mathematical Model

The set of protocols: $J=\{P_1, P_2, \ldots, P_n\}$

Queues for different protocols that need to share channel time: $Q_1, Q_2, \ldots, Q_n$ The (estimated) airtime needed to transmit traffic in queues: $R_1, R_2, \ldots, R_n$; these numbers are protocol and speed dependent.

Estimated "arrival rate" of airtime needed for new traffic every second: $r_1, r_2, \ldots, r_n$ ($0 \leq r_i \leq 1$); note that by setting $r_i=0$, we can easily turn off the stochastic components. The estimation for $r_i$ varies over time and is adjusted with feedback from previous transmission cycles. These estimates form the stochastic traffic model of the airtime scheduler.

Airtime allocation decision: $D=<(P(k_1), T(k_1)), (P(k_2), T(k_2)), \ldots, (P(k_n), T(k_n))>$, where $P(k_i)$'s denote protocol/speed and $T(k_i)$'s denote airtime allocated.

Penalty functions: $L_i(D)$ for protocol $P_i$ given allocation decision D.

A deadline for each protocol can also be imposed: $U_i$ for $P_i$.

Switch time to change from protocol $P_i$ to protocol $P_j$: $S_{ij}$.

Objective

Let $w_1, w_2, \ldots, w_n$ be weights that represent biases for the transmission protocols. The weights can be assigned at the discretion of the service provider for favoring selected protocols. The objective is to find an airtime allocation decision D such that the following objective function is minimized:

$V(J, t, P_0)=\Sigma_{\{j \text{ in } J\}} w_j * L_j(D)$, where $P_0$ is a "dummy" protocol with no switch time penalty, that is, $S_{0j}=0$.

Preferably, the penalty for any given protocol is selected to be either makespan, latency, or lateness; the choice is determined by the nature of the protocol and the desires of the service provider.

(When $L_j(D)=T_j$ then $V(J)$ is the (weighted) makespan.)

(When $L_j(D)=(\Sigma_{\{Pi \text{ precede } Pj\}} T_i)+T_j$ then $V(J)$ is the (weighted) total latency.)

(When $L_j(D)=Z((\Sigma_{\{Pi \text{ precede } Pj\}} T_i)-U_j)$ then $V(J)$ is the (weighted) total lateness), where $Z(x)=x$ if $x>0$; otherwise $Z(x)=0$.

Recursive Relation $V(J, t, P_k)=MIN_{\{Pj \text{ in } J\}}(V(J-\{P_j\}, t+T_j+S_{kj}, P_j)+S_{kj}+w_j*T_j)$, (for makespan)

or $V(J, t, P_k)=MIN_{\{Pj \text{ in } J\}}(V(J-\{P_j\}, t+T_j+S_{kj}, P_j)+(\Sigma\{i \neq j\} w_i)*(S_{kj}+T_j)+w_j*L_j(P_j, T_j))$, (for total latency or total lateness), where t is the initial delay and the following relation holds:

$T_j=R_j+r_j*(T_j+t) \rightarrow T_j=(R_j+r_j*t)/(1-r_j)$.

Initial Conditions $V(\{P_j\}, t, P_0)=L_j(<P_j, (R_j+r_j*t)/(1-r_j)>)$ for $j=1, \ldots, n$ Example The following example is for a system using two protocols (POCSAG and FLEX™).

Let P1=FLEX, P2=POCSAG, so J={FLEX, POCSAG}.

Let the traffic in queue at the queue measurement time be for FLEX $R_{FLEX}=10$ seconds, and for POCSAG $R_{POCSAG}=28$ seconds.

Figure 5:
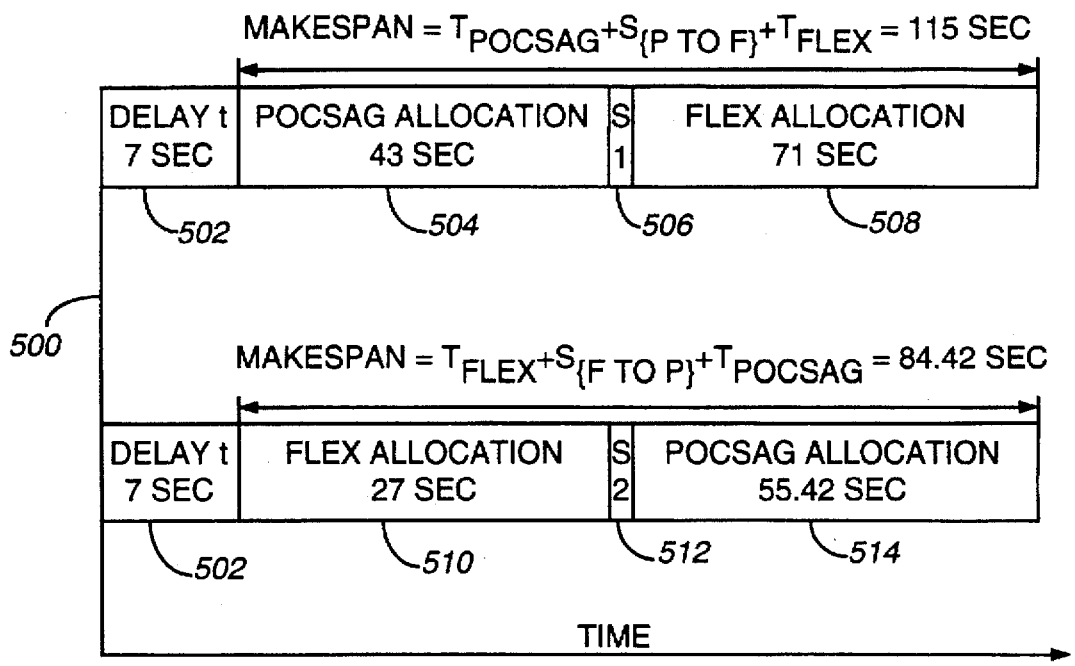
FIGS. 5–7 depict an exemplary airtime allocation chart to help define and explain the terminology and notations used in the mathematical model.

Let the delay before the allocation takes effect be t=7 seconds.
Let the traffic modeler estimate of the arrival rate for FLEX be $r_{FLEX}=0.5$, and for POCSAG be $r_{POCSAG}=0.3$.
Let $S_{\{POCSAG\ to\ FLEX\}}=1$ second and $S_{\{FLEX\ to\ POCSAG\}}=2$ seconds An exemplary airtime allocation chart 500 is depicted in FIG. 5 (times not to scale). The allocation chart 500 depicts two airtime allocations, starting with a delay 502 of 7 seconds after the queue measurement time before the allocations can take place. Allocation one comprises a POCSAG allocation 504 first, followed by the POCSAG-to-FLEX switch time 506 of 1 second, followed by a FLEX allocation 508. Allocation two comprises a FLEX allocation 510 first, followed by a FLEX-to-POCSAG switch time 512 of 2 seconds, followed by a POCSAG allocation 514. Note that the transmission durations, and thus the makespans are different for allocations one and two.

The calculation of the transmission durations is as follows:

When POCSAG is first, allocation for POCSAG=$T_{POCSAG}$= $(R_{POCSAG}+r_{POCSAG}*t)/(1-r_{POCSAG})=43$ seconds, and allocation for FLEX=$T_{FLEX}=(R_{FLEX}+r_{FLEX}*(t+43+S_{\{POCSAG\ to\ FLEX\}}))/(1-r_{FLEX})=71$ seconds.
When FLEX is first, allocation for FLEX=$T_{FLEX}=(R_{FLEX}+r_{FLEX}*t)/(1-r_{FLEX})=27$ seconds, and allocation for POCSAG=$T_{POCSAG}=(R_{POCSAG}+r_{POCSAG}*(t+27+S_{\{FLEX\ to\ POCSAG\}}))/(1-r_{POCSAG})=55.42$ seconds.

Figure 6:
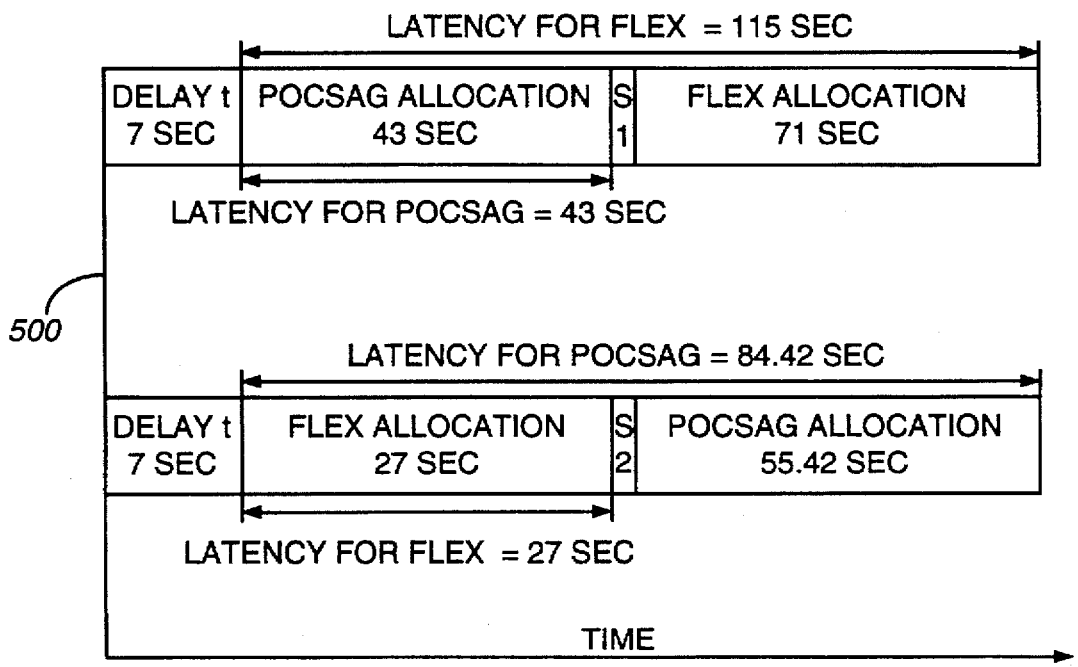

Continuing with the allocation chart 500, latency is defined in FIG. 6. Note that individual latency of each protocol is measured from the start of the transmission cycle to the end of transmission of the protocol. Total latency for the system is calculated as the sum of the individual latencies. Thus total latency for this example is:

Total Latency=43+115=158 (when POCSAG is first), and
Total Latency=27+84.42=111.42 (when FLEX is first).

Figure 7:
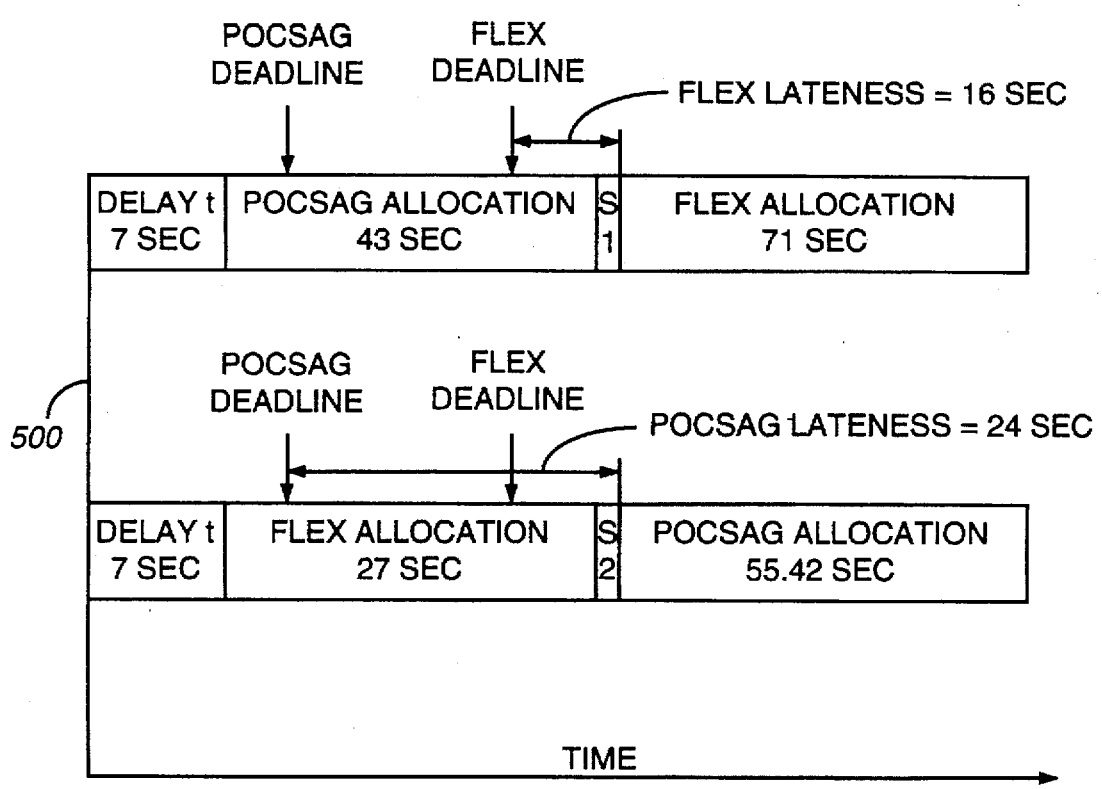

To illustrate lateness, let the deadline for POCSAG to start be $U_{POCSAG}=5$ (after delay) and the deadline for FLEX be $U_{FLEX}=28$ (after delay), then lateness is as depicted in FIG. 7. For POCSAG first, POCSAG lateness=0, and FLEX lateness=44-28=16 seconds. Thus, total lateness for the system=16 seconds. For FLEX first, FLEX lateness=0, and POCSAG lateness=29-5=24 seconds. Thus total system lateness=24 seconds.

Optimization

Let weights be all unity. There are two possibilities (1) FLEX first (2) POCSAG first:
POCSAG first gives us D=<(POCSAG, 43 seconds), (FLEX, 71 seconds)>
FLEX first gives us D=<(FLEX, 27 seconds), (POCSAG, 55.42 seconds)>
Table 1 depicts makespan, latency, and lateness values corresponding to the example values.

TABLE 1

|  | makespan | latency | lateness |
|---|---|---|---|
| 1. POCSAG first | 115 | 158 | 16 |
| 2. FLEX first | 84.42 | 111.42 | 24 |

Thus, (1) is better if we use lateness as objective, (2) is better if makespan or latency is used.

Recursive Relation

For makespan, the optimal value for V({FLEX, POCSAG}, 7, $P_0$) is the MIN of two possibilities:
(1) POCSAG gets airtime first, and
(2) FLEX gets airtime first.

If (1), we have (Let $w_{FLEX}=1$, $w_{POCSAG}=1$)
V({FLEX, POCSAG}, 7, $P_0$)=V({FLEX}, 7+$T_{POCSAG}$)+ $S_{\{POCSAG\ to\ FLEX\}}+T_{POCSAG}$.
where $T_{POCSAG}$=V({POCSAG}, 7, $P_0$)=43 and V({FLEX}, 7+$T_{POCSAG}+S_{\{POCSAG\ to\ FLEX\}}$, $P_{POCSAG}$)=71.
If (2), we have
V({FLEX, POCSAG}, 7, $P_0$)=V({POCSAG}, 7+$T_{FLEX}+S_{\{FLEX\ to\ POCSAG\}}+T_{FLEX}$,
where $T_{FLEX}$=V({FLEX}, 7)=27 and V({POCSAG}, 7+$T_{FLEX}+S_{\{FLEX\ to\ POCSAG\}}$, $P_{FLEX}$)=55.42.

So the makespan for (1) is 115 and the makespan for (2) is 84.42. Therefore, (2) is better. Please note that an optimal policy heuristic of Smallest Penalty First also selects (2), because FLEX alone (27 seconds) is less than POCSAG alone (43 seconds).

Thus, it should be apparent by now that the present invention provides a method and apparatus for a novel stochastic, multiple decision airtime scheduler that not only considers the present traffic load but also advantageously constructs a stochastic traffic model that can efficiently allocate airtime for multiple protocols. In addition, the method and apparatus coordinate the airtime allocation with dynamic channel allocation decisions made for reuse traffic.

What is claimed is:

1. A stochastic method for scheduling airtime in a radio communication system having a plurality of transmission protocols, the stochastic method comprising the steps of:
measuring a plurality of airtimes required to transmit messages stored at a queue measurement time in queues corresponding to the plurality of transmission protocols;
determining a corresponding plurality of estimated arrival rates equal to estimated rates of increase of the plurality of airtimes due to arriving traffic;
structuring an objective function equal to a sum of penalties corresponding to the plurality of transmission protocols, the penalties dependent upon the plurality of airtimes and the plurality of estimated arrival rates, and further dependent upon an optimal airtime allocation decision;
deriving the optimal airtime allocation decision by minimizing the objective function; and
allocating the airtime among the plurality of transmission protocols in accordance with the optimal airtime allocation decision.

2. The stochastic method of claim 1, further comprising, prior to the structuring step, the step of
choosing at least one type of penalty for the sum of penalties, the at least one type selected from a group of penalty types consisting of a makespan, a total latency, and a total lateness.

3. The stochastic method of claim 1, wherein the deriving step comprises the step of
applying dynamic programming techniques to minimize the objective function.

4. The stochastic method of claim 1, wherein the deriving step comprises the step of
applying an optimal policy to minimize the objective function.

5. The stochastic method of claim 1, further comprising the steps of:
calculating actual arrival rates and actual penalties while the optimal airtime allocation decision is executed; and
adjusting the plurality of estimated arrival rates in response to the actual arrival rates and the actual penalties calculated.

6. The stochastic method of claim 1, wherein the measuring step comprises the step of coordinating with channel allocation decisions made for frequency reuse traffic in order to derive the plurality of airtimes.

7. The stochastic method of claim 1, wherein the deriving step comprises the steps of:

determining a plurality of transmission durations corresponding to the plurality of transmission protocols;

determining an order of transmission for the plurality of transmission protocols; and adjusting ones of the plurality of transmission durations to accommodate the arriving traffic that is estimated to arrive between the queue measurement time and an end of transmission of corresponding ones of the plurality of transmission protocols.

8. The stochastic method of claim 1, wherein the structuring step further comprises the step of considering switch times required to switch from one of the plurality of transmission protocols to a next one of the plurality of transmission protocols when structuring the penalties.

9. A controller for scheduling airtime in a radio communication system having a plurality of transmission protocols, the controller comprising:

a processing system for directing operations of the controller;

a network interface coupled to the processing system for receiving messages from message originators; and a transceiver interface coupled to the processing system for controlling a plurality of transmitters to send the messages utilizing the plurality of transmission protocols, wherein the processing system is programmed to:

measure a plurality of airtimes required to transmit the messages stored at a queue measurement time in queues corresponding to the plurality of transmission protocols;

determine a corresponding plurality of estimated arrival rates equal to estimated rates of increase of the plurality of airtimes due to arriving traffic;

structure an objective function equal to a sum of penalties corresponding to the plurality of transmission protocols, the penalties dependent upon the plurality of airtimes and the plurality of estimated arrival rates, and further dependent upon an optimal airtime allocation decision;

derive the optimal airtime allocation decision by minimizing the objective function; and allocate the airtime among the plurality of transmission protocols in accordance with the optimal airtime allocation decision.

10. The controller of claim 9, wherein the controller is further programmed to choose at least one type of penalty for the sum of penalties, the at least one type selected from a group of penalty types consisting of a makespan, a total latency, and a total lateness.

11. The controller of claim 9, wherein the controller is further programmed to apply dynamic programming techniques to minimize the objective function.

12. The controller of claim 9, wherein the controller is further programmed to apply an optimal policy to minimize the objective function.

13. The controller of claim 9, wherein the controller is further programmed to:

calculate actual arrival rates and actual penalties while the optimal airtime allocation decision is executed; and adjust the plurality of estimated arrival rates in response to the actual arrival rates and the actual penalties calculated.

14. The controller of claim 9, wherein the controller is further programmed to coordinate with channel allocation decisions made for frequency reuse traffic in order to derive the plurality of airtimes.

15. The controller of claim 9, wherein the controller is further programmed to:

determine a plurality of transmission durations corresponding to the plurality of transmission protocols;

determine an order of transmission for the plurality of transmission protocols; and adjust ones of the plurality of transmission durations to accommodate the arriving traffic that is estimated to arrive between the queue measurement time and an end of transmission of corresponding ones of the plurality of transmission protocols.

16. The controller of claim 9, wherein the controller is further programmed to consider switch times required to switch from one of the plurality of transmission protocols to a next one of the plurality of transmission protocols when structuring the penalties.

* * * * *